United States Patent [19]

Tesoro

[11] 3,876,593
[45] Apr. 8, 1975

[54] AZIRIDINYL POLYOLEFINS AND METHOD OF PREPARING SAME
[75] Inventor: Giuliana C. Tesoro, Dobbs Ferry, N.Y.
[73] Assignee: J. P. Stevens & Co., Inc., New York, N.Y.
[22] Filed: Feb. 7, 1972
[21] Appl. No.: 224,355

Related U.S. Application Data
[63] Continuation of Ser. No. 452,385, April 30, 1965, abandoned.

[52] U.S. Cl............... 260/79.3 R; 8/116.2; 8/127.6; 8/128.5; 260/80; 260/80.72; 260/80.8
[51] Int. Cl...... C08f 7/12; C08f 27/08; C08f 15/00
[58] Field of Search......... 260/79.3 R, 2 EN, 239 E; 8/116.2, 127.6, 128.5

[56] References Cited
UNITED STATES PATENTS

| 2,852,497 | 9/1958 | Thompson | 260/79.3 R |
| 3,001,965 | 9/1961 | Kalil | 260/28.5 |
| 3,230,029 | 1/1966 | Cappuccio | 8/55 |

Primary Examiner—Christoper A. Henderson
Attorney, Agent, or Firm—Michael T. Frimer; Charles Stein

[57] ABSTRACT

Novel polymers are derived from chlorosulfonated polyethylene by replacing chlorine atoms in the chlorosulfonyl groups with aziridinyl radicals. These polymers can be used to improve the properties of wool and cellulosic textile materials. Additionally, the polymers can be crosslinked to form a product useful as a binder.

3 Claims, No Drawings

AZIRIDINYL POLYOLEFINS AND METHOD OF PREPARING SAME

This is a continuation of application Ser. No. 452,385, filed Apr. 30, 1965 and now abandoned.

This invention relates to novel polyolefins as well as to methods of preparing said polyolefins. More particularly, this invention relates to the preparation of polyolefins containing reactive aziridinyl groups.

It has been proposed to modify various textile materials with polyolefins in order to impart to such materials properties of dimensional stability, tear strength, abrasion resistance, and the like. However, cellulosic textiles, when treated with polyolefins, do not maintain the desired degree of tear strength and abrasion resistance upon continued laundering. Also, proteinaceous materials like wool often undergo modification only at the cost of fiber bonding and impairment of hand.

It is an object of this invention to provide novel polyolefins which can be employed in the modification of textile materials and polymeric materials containing active hydrogen atoms.

It is another object of this invention to provide a process for the synthesis of the aforementioned polyolefins.

A further object of this invention is to provide a process for shrinkproofing keratin fibers and particularly wool.

A still further object of this invention is to provide a process for enhancing the strength characteristics of cellulosic textiles.

Other objects and the advantages of this invention will be apparent from the description that follows.

In accordance with this invention there are prepared polymeric derivatives of chlorosulfonated polyethylene wherein chlorine atoms in the —SO$_2$Cl groups of chlorosulfonated polyethylene are replaced with aziridine radicals selected from the group consisting of

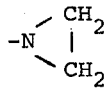 and 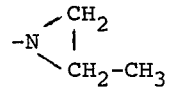

The above polymeric derivatives can be prepared by reacting chlorosulfonated polyethylene with either ethylene imine or propylene imine in the presence of an acid acceptor. Suitable acid acceptors include inorganic bases such as alkali or alkaline earth carbonates and organic bases of comparable strength free of active hydrogen atoms, e.g., tertiary amines such as triethylamine.

The reaction is conveniently carried out in an inert solvent such as chlorinated solvents (e.g., carbon tetrachloride, perchloroethylene, and the like), hydrocarbon solvents (e.g., toluene, xylene and the like), and ether solvents (e.g, dioxane, tetrahydrofuran and the like), by dissolving the chlorosulfonated polyethylene and adding the imine compound in the presence of an acid acceptor. The amount of imine compound used should not be less than the stoichiometric amount calculated on the basis of the number of acid halide groups present. Excess imine can be conveniently used, although an excess greater than 100% is preferably avoided to minimize side reactions such as polymerization.

The following equation illustrates a specific example of the present invention:

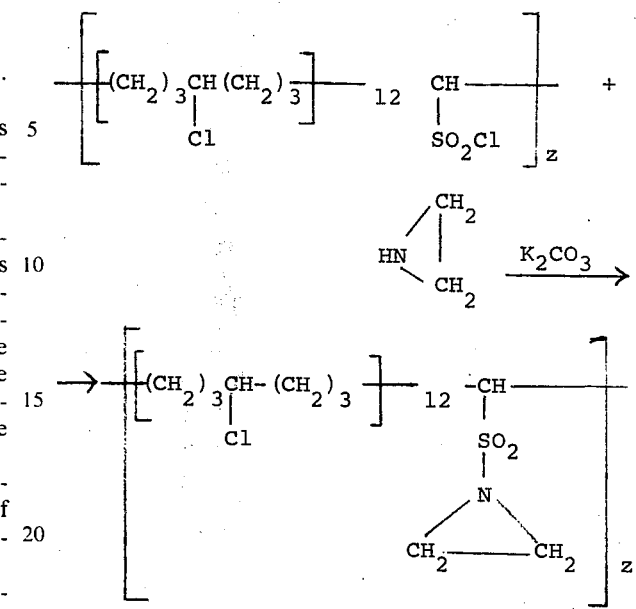

where z represents the number of repeating units in the polymer molecule.

The reaction is generally carried out at temperatures of from about zero degrees to about 50°C. Ambient temperatures in many instances can be used conveniently. The reaction times required for completion of the reaction vary considerably, depending on the structure and concentration of the starting materials, on the solvent and on the acid acceptor.

The aziridinyl modified polyolefins may also undergo "self-crosslinking" by heating for from about 2 to 20 minutes at temperatures greater than 100°C., and preferably from about 125°C. to about 175°C.

Under suitable conditions, the aziridinyl polyolefins, or their precursors, of the present invention may be admixed and reacted with compounds containing active hydrogen to form new products.

The aziridinyl modified polyolefins of this invention are of particular utility in improving the dimensional stability of keratin fibers (especially wool) and in enhancing the strength characteristics of cellulosic textiles. Moreover, the aforementioned improvements in textile materials are accomplished without detrimentally affecting the aesthetic properties of the materials. The polyolefins are stable in the presence of moisture and thus can be formulated as aqueous emulsions or as organic solvent solutions and subsequently applied to the desired textile material.

When applied to textiles comprising wool, the modified polyolefins may be employed in amounts as low as about 2%, by weight, as based on the weight of the wool. Although the quantity of polyolefin used is surprisingly small, essentially complete dimensional stability of the wool fabric is possible. The application of the modified polyolefins may be carried out on conventional equipment and other additives, e.g., stain repellents, may be combined with the polyolefins in order to obtain several functional properties in a single process.

When applied to cellulosic textiles, the modified polyolefins not only increase the tear strength and abrasion resistance thereof, but also improve the hand and appearance of the textiles. In fact, cotton fabrics acquire silk-like drapeability and feel when finished with the polyolefins of this invention. It is particularly advantageous that these enhanced properties are retained through numerous launderings.

As was mentioned previously, the reactive polyolefins may also undergo self-crosslinking. They can thus be applied as emulsions or organic solvent solutions to non-woven fibrous assemblies and subsequently cured, in situ, to obtain the bonded product.

The aziridinyl polyolefins of this invention are effective whether or not the material to be treated contains active hydrogen atoms. In the absence of active hydrogen atoms crosslinking of the aziridinyl polyolefins is believed to occur through polymerization of the aziridinyl groups. In the presence of active hydrogen atoms, the aziridinyl groups are believed to react with such atoms, thereby forming chemical covalent bonds. It is also within the contemplation of this invention that the aziridinyl polyolefins may be used to graft polyolefin chains on any polymer containing active hydrogen atoms.

In the examples which follow, all parts given are by weight unless otherwise indicated. The test results shown in the examples were obtained according to the following methods.

| | |
|---|---|
| Stiffness | Cantilever procedure ASTM-D-1388-55T |
| Tear Strength | ASTM-D1424-63 |
| Tensile Strength | Ravel Strip Method ASTM-D1682-59T |
| Flex Abrasion | ASTM-D-1175-61T (Stoll Flex Abrader, ½ lb. head, 2 lbs. toggle) |
| Shrinkage | Wool samples laundered in automatic house-type agitator washing machine at 105°F. for the full cycle, except 15 minutes suds time (household detergent), 5 lb. load. Samples were dried flat on horizontal screen, flat-bed pressed for 5 seconds (no steam). |
| Reflectance | ASTM-E97-55, Photovolt 610 and Search Unit 6104, using the green tristumulus filter. |
| Laundering | (Cotton): Samples laundered in automatic home-type agitator washing machine at 140°F. for the full cycle (household detergent), 5 lb. load. Samples flat-bed pressed. |
| Oil Repellency | Minnesota Mining Bulletin on Fluorochemicals, Appendix A, pages 1–2. |

Example 1

PREPARATION OF POLYETHYLENE SULFONYL ETHYLENE IMINE

To a three-necked flask equipped with a stirrer, a thermometer, a reflux condenser and a dropping funnel were charged 3.1 parts potassium carbonate and 1.5 parts ethylene imine dissolved in 100.0 parts toluene. The mixture was then stirred and kept at 15°–20°C. and into the cooled mixture 50 parts of Hypalon 20 (a chlorosulfonyl polyethylene rubber, %S = 1.4%, %Cl = 29.0%, made by E. I. du Pont according to U.S. Pat. No. 3,119,830) dissolved in 300.0 parts toluene were added dropwise. The addition was completed in 1 hour. The mixture was then stirred for an additional 2 hours at 25° to 30°C. The inorganic materials were then filtered off and the homogeneous solution was placed under vacuum to drive off residual unreacted ethylene imine. The percent solid content of the viscous clear solution, determined from the weight difference of a sample heated to dryness at 130°C., was found to be 12.0%. A heat-cured sample of the residual solid, after extraction with toluene, acetone and water and drying was found to have 0.53% N, which corresponded to an 86% yield in the amidation of the chlorosulfonyl group in the Hypalon 20.

EXAMPLE 2

PREPARATION OF POLYETHYLENE SULFONYL ETHYLENE IMINE

To a three-necked flask equipped with a stirrer, a thermometer, a reflux condenser and a dropping funnel were charged 4.3 parts potassium carbonate and 1.5 parts ethylene imine dissolved in 100.0 parts toluene. The mixture was stirred and cooled to 15°–20°C. To the mixture 100.0 parts Hypalon 30 (a chlorosulfonyl polyethylene rubber - %S = 1.0%, %Cl = 4.2% made by E. I. du Pont, according to U.S. Pat. No. 3,119,830) dissolved in 400.0 parts toluene were added dropwise. The addition was completed in 1 hour. After the addition, the mixture was stirred for 2 hours at 15°–20°C. and another 2 hours at 25°–30°C. The inorganic materials precipitated were separated by filtration, and unreacted ethylene imine was stripped off under vacuum at room temperature. The solid content of the homogeneous viscous solution was 13.0% determined in the same manner as in Example 1. A cured sample after extraction with toluene, acetone and water and drying was found to contain 0.57% N which corresponds to a 100% yield in the amidation of the chlorosulfonyl groups in the Hypalon 30.

EXAMPLE 3

PREPARATION OF POLYETHYLENE SULFONYL PROPYLENE IMINE

To a three-necked flask equipped with a stirrer, a reflux condenser, a thermometer and a dropping funnel were charged 6.1 parts potassium carbonate and 2.8 parts propylene imine dissolved in 100.0 parts toluene. To the stirred and cooled mixture (15°–20°C.) 100.0 parts Hypalon 20 dissolved in 400 parts toluene were added dropwise over a period of 1 hour. After the addition was completed, the mixture was stirred for 2 hours at 15°C. and another 2 hours at 25°–30°C. The inorganic materials precipitated were separated and unreacted propylene imine was stripped off under vacuum at room temperature. The solid content of the homogeneous and viscous solution determined as described in Example 1 was found to be 13.0%.

EXAMPLE 4

PREPARATION OF POLYETHYLENE PHOSPHONYL ETHYLENE IMINE

A mixture of 50.0 parts of polyethylene (av. mol. wt. 2,000) and 500.0 parts phosphorus trichloride were heated at 70°C. in a four-necked flask equipped with a mercury-sealed stirrer, a thermometer, a dry-ice/ethanol condenser and a gas capillary tube. Dry oxygen was slowly bubbled through the gas tube beneath the surface of the reaction mixture. The exit gas was passed through a trap immersed in a dry ice-acetone mixture to condense the entrained phosphorus trichloride and phosphorus oxychloride, and finally into a trap containing 250.0 parts of distilled water to absorb the hydrogen chloride evolved. The absorbed acid was titrated periodically with standard base over a period of 6 hours to determine the rate of reaction. The rate of phosphorylation determined from the evolved hydrogen chloride was approximately 0.1 milliequivalent of phosphorus introduced per hour per gram of polyethylene. After 6 hours of reaction under these conditions, the oxygen flow was stopped and the PCl$_3$ and POCl$_3$ were distilled from the reaction mixture at 50°–60°C. The recovered product was a light brown rubberlike solid.

A solution of 50.0 parts of the phosphorylated polyethylene dissolved in 800.0 parts of toluene was then charged into a three-necked flask equipped with a stirrer, a reflux condenser, a thermometer and a dropping funnel. The solution was kept at 5°–10°C., and into the cooled solution 7.1 parts of ethylene imine and 16.7 parts of triethylamine dissolved in 200.0 parts of toluene were added dropwise. The addition was completed in 1 hour and the solution was stirred for another 3 hours at 25°–30°C. The unreacted ethylene imine was then distilled off from the mixture under vacuum at room temperature. The solid content of the homogeneous solution, determined by the method used in Example 1, was found to be 4.0%.

EXAMPLE 5

GELATION OF POLYETHYLENE SULFONYL ETHYLENE IMINE

The polyethylene sulfonyl imine prepared according to the procedure of Example 1 was cured by self-crosslinking when exposed to heat. The rate of gelation was found to increase with the time of heating.

Into three weighing dishes were placed 20.0 parts of the 12.0% toluene solution of the product of Example 1. The dishes with their contents were heated at 130°C. in an oven for a period of 10 minutes, 20 minutes and 30 minutes, respectively. At the end of the curing time, the contents of the dish were extracted well with toluene, acetone and water and, finally dried to a constant weight. The weight difference before and after curing and subsequent extraction and drying was taken to measure the percent yield in the gelation of the polyethylene sulfonyl ethylene imine.

The polyethylene sulfonyl ethylene imine, when gelled within a fibrous substrate, acted as a binder therefor.

EXAMPLE 6

Example 5 was repeated using the product of Example 2 in place of the product of Example 1. The following results were obtained:

| Sample | Curing Time (Mins.) at 130°C. | Percent Yield of Crosslinked Polymer |
|---|---|---|
| 1 | 10 | 7.0 |
| 2 | 20 | 10.5 |
| 3 | 30 | 79.6 |

The gelled product serves as a binder for non-woven substrates.

EXAMPLE 7

Example 5 was repeated but the product of Example 3 was used in place of the product of Example 1. The following results were obtained:

| Sample | Curing Time (Mins.) at 130°C. | Percent Yield of Crosslinked Polymer |
|---|---|---|
| 1 | 10 | 16.2 |
| 2 | 20 | 27.2 |
| 3 | 30 | 93.1 |

The gelled product serves as a binder for non-woven substrates.

EXAMPLE 8 a. Samples of 100% woolen fabric in the ready-to-dye state were treated with the product of Example 1, applied from toluene solutions of varying concentration, using a laboratory padder and setting the rolls at such a pressure as to give a 116–120% wet pickup. The fabric samples so treated were framed and dried at 60°C., then cured for 5 minutes at 150°C. in a forced draft oven. The cured fabric samples were rinsed in toluene, in dioxane and in water, then framed to the original dimensions and dried. The test results on samples treated in accordance with this procedure were as follows:

| Sample | %Reagent Applied (OWF) | %Wt. Gain | %SHRINKAGE 5L W | 5L F | 10L W | 10L F | STIFFNESS mg/cm² W | FLEX ABRA. cycles W | REFLECTANCE |
|---|---|---|---|---|---|---|---|---|---|
| A | 4.3 | 3.1 | 0.5 | 1.5 | 0.5 | 1.5 | 185 | 750 | 60 |
| B | 3.1 | 2.2 | 1.5 | 2.0 | 2.0 | 2.0 | 152 | 725 | 60 |
| C | 2.1 | 1.7 | 2.5 | 2.5 | 3.0 | 3.5 | 130 | 650 | 60 |
| D | 1.1 | — | 4.0 | 4.5 | 8.0 | 7.5 | 125 | 575 | 60 |
| Untreated Control | | | 13.5 | 11.5 | 24.0 | 20.5 | 83 | 600 | 61 |

L = Launderings as specified
OWF = On Weight of Fabric
Wt.Gain = Weight increase due to treatment (after washing)

| Sample | Curing Time (Mins.) at 130°C. | Percent Yield of Crosslinked Polymer |
|---|---|---|
| 1 | 10 | 87.8 |
| 2 | 20 | 88.5 |
| 3 | 30 | 99.0 | b. When 8(a) was repeated using Hypalon 20 in place of the aziridinyl reaction product prepared according to the procedure of Example 1, the following results were obtained:

| Sample | %Reagent Applied (OWF) | Curing Time in Minutes | %SHRINKAGE after 5L W | F |
|---|---|---|---|---|
| A | 4.0 | 5 | 14.5 | 12.5 |
| B | 4.0 | 15 | 12.5 | 10.0 |
| Untreated Control | | — | 16.5 | 14.5 |

From this control experiment, it is apparent that the conversion of the Hypalon to the aziridinyl derivative is essential for obtaining the desired shrinkproofing effect on wool.

EXAMPLE 9

Samples of a 100% woolen fabric in the ready-to-dye state were treated with the product of Example 1, from an aqueous emulsion.

The emulsion was prepared by mixing a 12% toluene solution of the product of Example 1, with an equal amount of a 12.8% aqueous solution of potassium oleate using a high speed stirrer. The emulsion was homogenized in a colloid mill and diluted to the desired concentration with a 6.4% aqueous potassium oleate solution.

The fabric samples were treated with the emulsion using a laboratory padder setting the rolls at such a pressure as to give a 96–103% wet pickup. The fabric samples so treated were framed and dried at 60°C., then cured for 15 minutes at 150°C. in a forced draft oven. The cured fabric samples were rinsed in toluene, dioxane and finally in water. The samples were then framed to the original dimensions and dried. Test results were as follows:

| Sample | %Reagent Applied (OWF) | %SHRINKAGE AFTER 5L W | F | 10L W | F | STIFFNESS mg/cm² W | FLEX ABRASION Cycles-W |
|---|---|---|---|---|---|---|---|
| A | 4.1 | 3.0 | 2.5 | 3.5 | 2.5 | 132 | 700 |
| B | 3.0 | 3.0 | 3.5 | 3.5 | 3.5 | 107 | 700 |
| C | 2.0 | 5.0 | 5.5 | 7.5 | 6.5 | 89 | 650 |
| D | 1.0 | 7.0 | 4.5 | 10.0 | 6.5 | 95 | 550 |
| Untreated Control | | 18.0 | 14.5 | 20.5 | 17.5 | 86 | 575 |

EXAMPLE 10

Example 8 was repeated but the product of Example 3 was used in place of the product of Example 1 and the curing time at 150°C. was varied. The following results were obtained:

| Sample | %Reagent Applied (OWF) | Curing Time in Minutes | %SHRINKAGE AFTER 5L W | F | STIFFNESS mg/cm² W | FLEX ABRASION Cycles-W | REFLEC- TANCE |
|---|---|---|---|---|---|---|---|
| A | 4.1 | 5 | 1.5 | 3.5 | 202 | 700 | 59 |
| B | 4.2 | 15 | 2.0 | 2.5 | 191 | 650 | 58 |
| C | 2.1 | 5 | 4.5 | 3.5 | 140 | 650 | 58 |
| D | 2.0 | 15 | 2.0 | 3.5 | 140 | 550 | 58 |
| Untreated Control | | | 18.0 | 15.0 | 92 | 625 | 60 |

EXAMPLE 11

Example 8 was repeated but using the product of Example 2 in place of the product of Example 1. The samples were cured at 150°C. for the time specified below:

| Sample | %Reagent Applied (OWF) | Curing Time in Minutes | %Wt. Gain | %SHRINKAGE AFTER 5L W | F |
|---|---|---|---|---|---|
| A | 4.5 | 5 | 1.5 | 4.5 | 8.0 |
| B | 4.3 | 15 | 3.6 | 3.5 | 4.5 |
| C | 2.2 | 5 | 1.6 | 16.0 | 12.0 |
| D | 2.2 | 15 | 2.2 | 6.5 | 2.0 |
| Untreated Control | | | | 18.0 | 15.0 |

EXAMPLE 12

Samples of 100% woolen fabric in the ready-to-dye state were treated with Hypalon 20 from toluene solution using a laboratory padder at such a pressure to give 120% wet pickup. The fabric samples so treated were dried at 60°C. on frames. The dried samples were then treated with an aqueous solution of aminoethyl sulfuric acid (AES) and $K_2CO_3$ using a laboratory padder to give 113–119% wet pickup. The fabric samples so treated were again framed to the original dimensions and dried at 60°C., then cured at 150°C. for 15 minutes in a forced-draft oven. The cured fabric samples were rinsed in toluene, dioxane and finally in water.

The samples were then framed and dried.

The following results were obtained:

| | REAGENTS APPLIED | | | | | |
|---|---|---|---|---|---|---|
| Sample | Hypalon 20 (OWF) (1st padding) | %AES (OWF) | +%K₂CO₃ (OWF) (2nd padding) | %Weight Increase | %SHRINKAGE AFTER 5L W | F |
| A | 4.6 | 0.25 | 0.24 | 3.4 | 3.5 | 6.0 |
| B | 2.4 | 0.12 | 0.12 | 3.0 | 4.0 | 5.5 |
| Untreated Control | | | | | 19.0 | 11.5 |

EXAMPLE 13

Example 8 was repeated using the product of Example 4 in place of the product of Example 1. The samples were cured at 160°C. for the time specified below, and the following results were obtained:

| Sample | %Reagent Applied (OWF) | Curing Time in Minutes | %SHRINKAGE 5L W | F |
|---|---|---|---|---|
| A | 4.8 | 5 | 6.5 | 5.5 |
| B | 4.7 | 15 | 4.5 | 7.5 |
| C | 2.4 | 5 | 9.0 | 9.5 |
| D | 2.4 | 15 | 7.5 | 8.0 |
| Untreated Control | | | 16.5 | 15.0 |

EXAMPLE 14

Samples of plain-weave cotton fabric (commonly known as 80 × 80 print cloth) were treated with the product of Example 1 from toluene solution using a laboratory padder and setting the rolls at such a pressure as to give 75% wet pickup. The fabric samples so treated were framed to the original dimensions and dried at 60°C., then cured at 150°C. for 10 minutes in a forced-draft oven. The fabric samples were rinsed in toluene and dioxane and then washed at 60°–70°C. with an aqueous solution of non-ionic detergent. The samples were framed and dried. The following results were obtained:

| Sample | %Reagent (OWF) | % W.G. | Tensile Strength Orig. W | Flex Abrasion Cycles After 10L W | Stiffness - W mg/cm$^2$ Orig. | After 10L |
|---|---|---|---|---|---|---|
| A | 2.0 | 1.0 | 55 | 800 | 71 | 76 |
| B | 1.2 | 0.9 | 57 | 825 | 71 | 69 |
| C | 0.5 | 0.8 | 57 | 700 | 71 | 75 |
| Untreated Control | | | 61 | 650 | 130 | 96 |

It is apparent that the treatment improves the abrasion resistance and softness of the cotton fabric without appreciable loss of tensile strength.

EXAMPLE 15

A sample of a plain-weave cotton fabric (commonly known as 80 × 80 print cloth) was treated with an aqueous emulsion of the product of Example 3.

The emulsion was prepared by mixing 500 g. of a 12% toluene solution of the product of Example 3, with 60.0 g. of a non-ionic surface active agent (Triton X-100, a product of the Rohm & Haas Chemical Company) with high speed stirring. The emulsion was stirred for 30 minutes and nitrogen gas was bubbled through it. The emulsion obtained in this manner was diluted with water to the desired concentration.

The cotton fabric sample was treated with a dilution of this emulsion containing 3% active ingredient, using a laboratory padder and setting the rolls at such a pressure as to get 80% wet pickup. The sample so treated was framed to the original dimensions and dried in a forced-draft oven at 60°C., then cured at 150°C. for 5 minutes. The cured sample was washed at 60°C. with detergent solution and dried. The properties of the sample, compared to those of an untreated control, were as follows:

| | Treated Sample | Untreated Control |
|---|---|---|
| %Reagent Applied OWF | 2.4 | — |
| %Weight Increase after washing | 1.9 | — |
| Tensile Strength | | |
| W - Original | 59 | 61 |
| 10L | 60 | 59 |
| Tear Strength | | |
| W - Original | 68 | 1.7 |
| 10L | 1.8 | 1.6 |
| Flex Abrasion | | |
| Cycles W - 10L | 425 | 375 |
| Stiffness - W | | |
| mg/cm$^2$ Original | 104 | 187 |

EXAMPLE 16 a. PREPARATION OF POTASSIUM SALT OF POLYETHYLENE AMINO ETHANE SULFONIC ACID

Into a three-necked flask equipped with a stirrer, a reflux condenser, a thermometer and a dropping funnel were charged 12.0 parts of potassium carbonate and 13.6 parts of 2-aminoethane hydrogen sulfate. Into the mixture kept at 15°–20°C. were added slowly 100.0 parts Hypalon 20 dissolved in 400.0 parts toluene over a period of 1 hour. The mixture was then stirred at 15°–20°C. for 2 hours and then at room temperature for another 2 hours. The inorganic base and the excess 2-aminoethane hydrogen sulfate precipitate were filtered off and the percent solid content of the homogeneous and viscous solution was found to be 17.9% as determined by the procedure described in Example 1.

b. GELATION OF POTASSIUM SALT OF POLYETHYLENE AMINO ETHANE SULFONIC ACID

The toluene solution of the potassium salt of the polyethylene sulfonyl amino ethane sulfonic acid was gelled in the same manner as described in Example 5. The following results were obtained:

| Sample | Curing Time (Min.) at 130°C. | Percent Yield of Crosslinked Polymer |
|---|---|---|
| 1 | 10 | 84.0 |
| 2 | 20 | 92.5 |
| 3 | 30 | 88.0 |

The gelled product serves as a binder for non-woven substrates.

EXAMPLE 17

PREPARATION OF POLYETHYLENE CARBOXYLETHYLENEIMINE

To a three-necked flask equipped with a stirrer, a thermometer, a reflux condenser and a dropping funnel were charged 5.0 parts potassium carbonate and 1.5 parts ethylene imine dissolved in 100.0 parts perchloroethylene. The mixture was then stirred and kept at 25°C. and into the mixture 70.0 parts of ZESET TP (a terpolymer of ethylene, methacryloyl chloride and vinyl acetate, made by E. I. du Pont) dissolved in 1330.0 parts perchloroethylene were added dropwise. The addition was completed in 1 hour, and the mixture was then stirred for an additional 3 hours at 25°C. The inorganic materials were then separated and the homogeneous solution was placed under vacuum to drive off residual unreacted ethylene imine. The percent solid content of the clear solution, determined from the weight difference of a sample heated to dryness at 130°C., was found to be 5.7%.

EXAMPLE 18

Example 9 was repeated, but 2% Scotchgard FC–208 (fluorochemical resin made by Minnesota Mining and Manufacturing Co., St. Paul, Minnesota) was added to the aqueous emulsion of the product of Example 1.

| Sample | %Reagent Applied (OWF) | %Shrinkage 5L W | F | Stiffness mg/cm$^2$ W | Flex Abrasion Cycles-W | Oil Repellency Orig. | 5L |
|---|---|---|---|---|---|---|---|
| Treated | 4.1 | 4.5 | 6.5 | 98 | 650 | 100 + | 50 |
| Untreated Control | | 17.0 | 15.5 | 75 | 625 | 0 | 0 |

EXAMPLE 19

A sample of 100% woolen fabric in the ready-to-dye state was treated with the product of Example 16 from toluene solution using a laboratory padder at such a pressure as to give 115% wet pickup. The fabric sample so treated was dried at 60°C. on frame. The dried sample was overpadded with 0.25% aqueous potassium carbonate solution using a laboratory padder. The fabric sample so treated was framed again to the original dimensions and dried at 60°C., then cured at 150°C. for 15 minutes in a forced-draft oven. The cured fabric sample was rinsed in toluene, dioxane and finally in water.

| Sample | Reagent Applied OWF | %Weight Increase | % Shrinkage - 5L W | F |
|---|---|---|---|---|
| Treated | 4.6 | 8.1 | 1.5 | 2.5 |
| Untreated Control | — | — | 20.0 | 16.0 |

EXAMPLE 20

Samples of 100% woolen and of 100% worsted wool fabric were treated with the product of Example 17 from perchloroethylene solution using a laboratory padder and setting the rolls at such a pressure to give 140–190% wet pickup. The fabric samples so treated were framed and dried at 100°C. for 2 minutes in a forced draft oven. The dried fabric samples were rinsed in dioxane and water, then framed to the original dimensions and dried. The test results on sample treated in accordance with this procedure were as follows:

| Sample Fabric | %Reagent Applied (OWF) | %Weight Gain | %Shrinkage 5L W | F | Flex Abrasion Cycles-W |
|---|---|---|---|---|---|
| Treated Woolen | 4.8 | 3.4 | 2.5 | 2.5 | 675 |
| Treated Worsted | 3.4 | 2.5 | 2.5 | 2.5 | 3700 |
| Untreated Worsted | — | — | 25.0 | 22.5 | 5000 |

EXAMPLE 21

APPLICATION OF POLYETHYLENE SULFONYL ETHYLENEIMINE AS A NON-WOVEN BINDER

Rayon staple non-woven webs were bonded together into strong and flexible cloth with the polyethylene sulfonyl ethyleneimine prepared in Example 1.

Two 4-inch by 4-inch non-woven webs were immersed into two 50.00 c.c. toluene solutions containing 2% and 5% polyethylene sulfonyl ethyleneimine, respectively. The residence time was 2 minutes and the coated webs were squeezed between glass rods before they were laid on top a wire cloth. The coated webs were then cured at 130°C. for 15 minutes in an oven. The cured webs were strong and flexible. After rinsing the cured webs in toluene and acetone, they were dried in an oven at 95°C. for 10 minutes. The dried web samples, together with an uncoated non-woven web, were immersed into boiling water for 30 minutes. The two webs bonded with the polyethylene sulfonyl ethyleneimine still maintained their strength, flexibility and dimensions, whereas an untreated non-woven web completely disintegrated into a fibrous mass.

Any departure from the above description which conforms to the present invention is intended to be included within the scope of the invention as defined by the following claims.

What is claimed is:

1. A polymer consisting essentially of repeating units of the formula

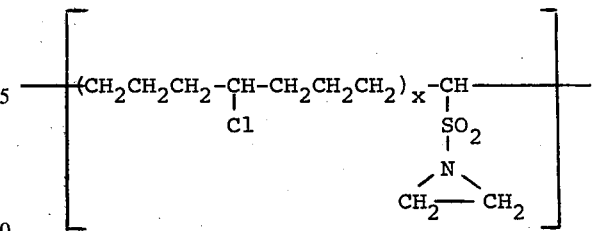

where $x$ is approximately 12.

2. A crosslinked polymer obtained by heating the polymeric derivative of claim 1 at temperatures in the range of 125° to 175°C.

3. A polymeric derivative of chlorosulfonated polyethylene wherein the modification of said chlorsulfonated polyethylene consists essentially of replacement of 86 to 100% of the chlorosulfonyl chlorine atoms of said chlorosulfonated polyethylene with radicals of the formula

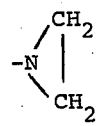

* * * * *

UNITED STATES PATENT AND TRADEMARK OFFICE
CERTIFICATE OF CORRECTION

PATENT NO. : 3,876,593
DATED : April 8, 1975
INVENTOR(S) : Giuliana C. Tesoro

It is certified that error appears in the above-identified patent and that said Letters Patent are hereby corrected as shown below:

Column 9, line 50, in the table under "Treated Sample "Tear Strength W - Original" the number should read -- 1.8 --.

Column 11, Example 19, in the table "Treated Sample" under "% Weight Increase" should read -- 3.1 --.

Column 11, Example 20, in the table, under "Sample Fabric" after "Treated Woolen" the omitted line should be inserted as follows: Reading across, under the first column insert -- Untreated Woolen --; second column -- leave space blank --; third column insert a dash; fourth column insert -- 15.5 --; fifth column insert -- 13.5 --; and in the last column insert -- 425 -- .

Signed and Sealed this

Twenty-fourth Day of August 1976

[SEAL]

Attest:

RUTH C. MASON
*Attesting Officer*

C. MARSHALL DANN
*Commissioner of Patents and Trademarks*